A. G. ARGO.
ATTACHMENT FOR HAY RAKES.
APPLICATION FILED DEC. 15, 1914.
1,166,963.
Patented Jan. 4, 1916.
2 SHEETS—SHEET 2.
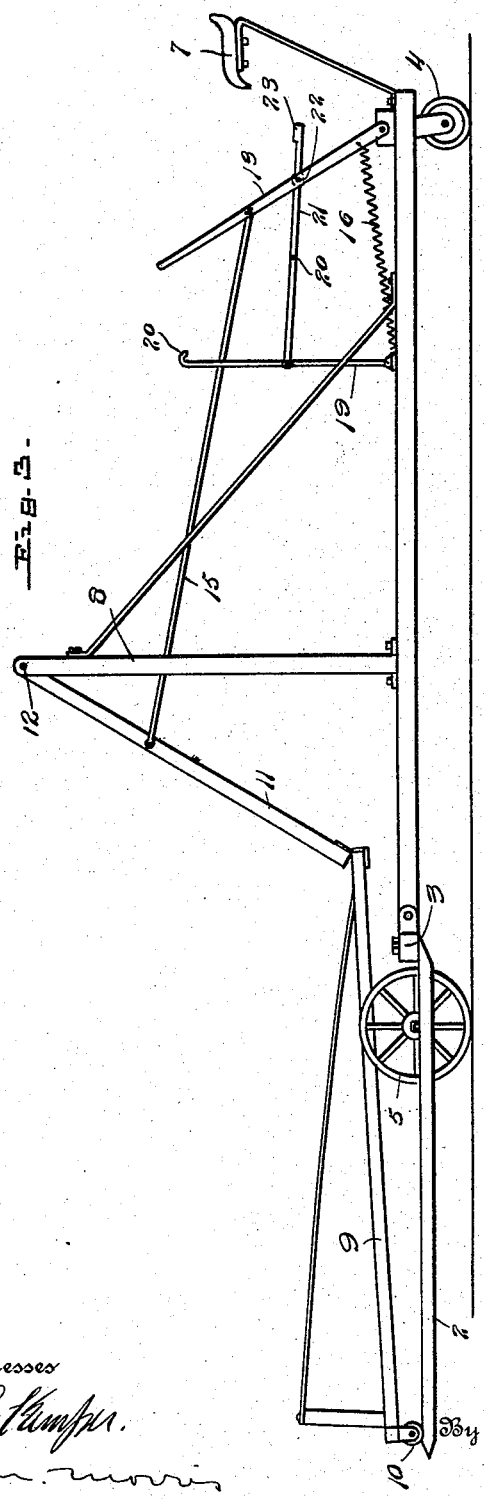
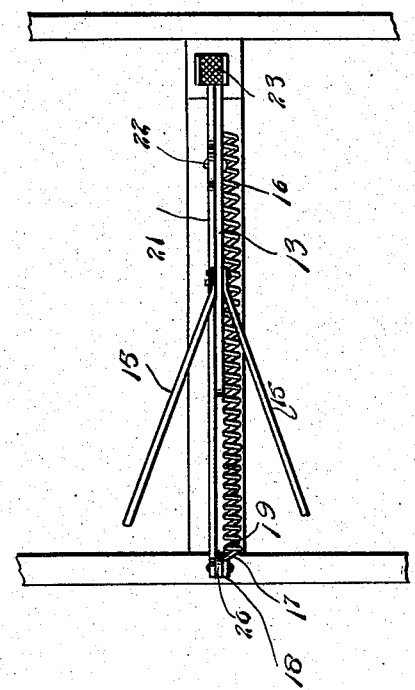
Witnesses
Inventor
A. G. Argo.
By
Attorneys

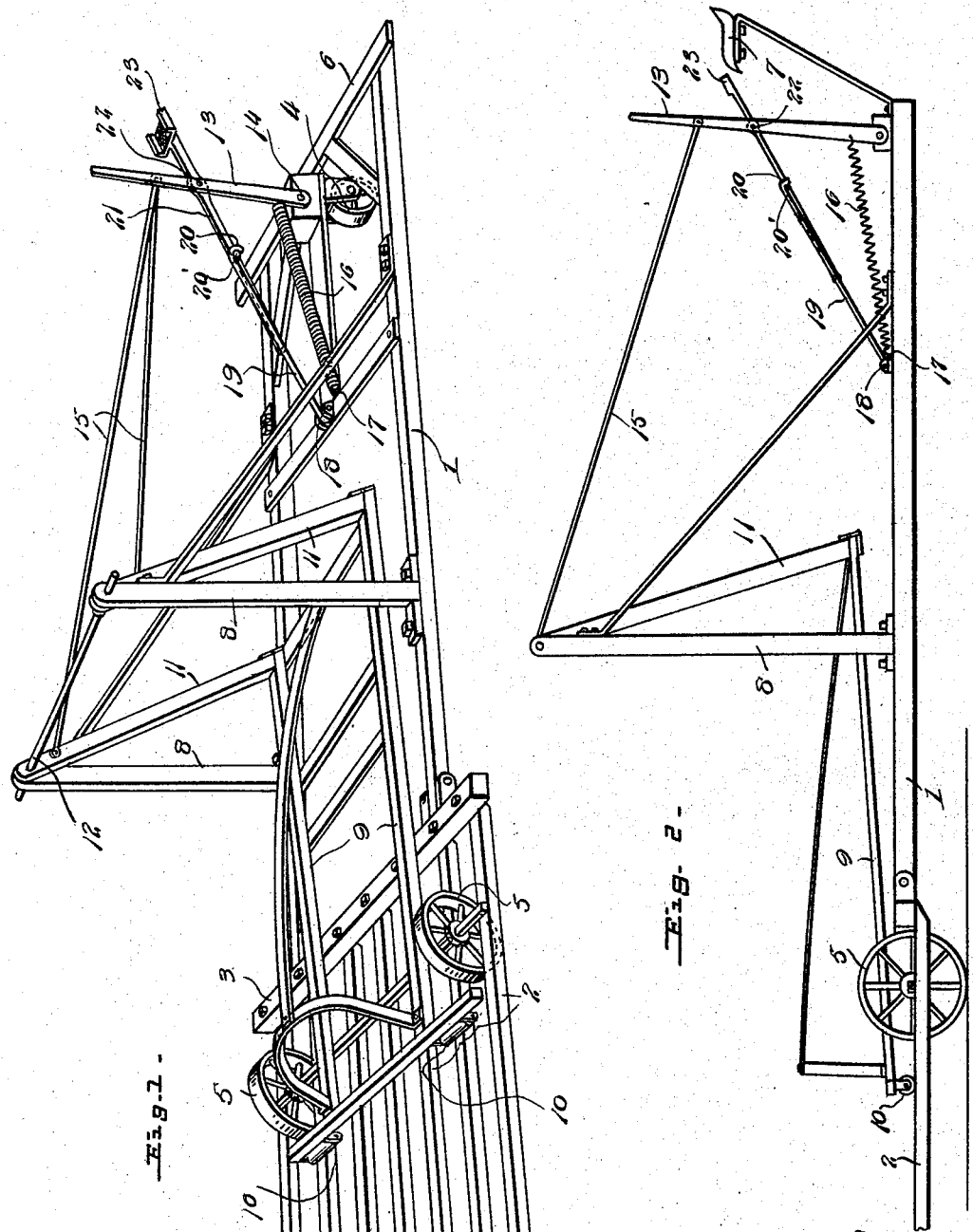

UNITED STATES PATENT OFFICE.

ALFRED G. ARGO, OF KENESAW, NEBRASKA.

ATTACHMENT FOR HAY-RAKES.

1,166,963.  Specification of Letters Patent.  Patented Jan. 4, 1916.

Application filed December 15, 1914. Serial No. 877,303.

*To all whom it may concern:*

Be it known that I, ALFRED G. ARGO, a citizen of the United States, residing at Kenesaw, in the county of Adams, State of Nebraska, have invented certain new and useful Improvements in Attachments for Hay-Rakes; and I do hereby declare the following to be a full, clear, and exact description of the invention, such as will enable others skilled in the art to which it appertains to make and use the same.

This invention relates to an attachment for hay rakes.

An object of the invention is to provide such an attachment that the hay collected on the sweep may be readily pushed therefrom.

A further object of the invention is to provide resilient means for automatically pushing the hay from the rake.

A still further object of the invention is to provide means for locking the device in inoperative position.

With these and other objects in view, such as will appear as the description progresses, my invention comprises the combination and arrangement of parts as herein set forth and subsequently claimed.

Referring to the drawing: Figure 1 is a perspective view of my device. Fig. 2 is a side elevation of the device, showing the relative positions of the parts when the hay is being collected on the sweep. Fig. 3 is a similar view, showing the relative position of the parts after the hay has been pushed from the sweep. Fig. 4 is a fragmental plan view, showing the operating mechanism.

Referring to the drawing wherein like parts are indicated by like characters throughout the several views, the reference character 1 indicates the frame of the sweep and the reference character 2 the teeth thereof which are secured together at their rear ends by a cross bar 3. The frame 1 is supported at its rear end by wheels 4 and the teeth 2 by wheels 5. On the cross bar 6 of the frame 1 is secured the operator's seat 7.

In order that the hay may be pushed from the teeth 2 of the sweep, I have provided two upwardly extending standards 8 which are secured to the frame 1 adjacent the rear end of the teeth 2. Slidably mounted on the teeth 2 in front of the standards 8, but independent of the said teeth is a pusher frame 9 which is supported by rollers 10 on the forward end thereof, which rollers ride upon the teeth 2 of the sweep. When the sweep teeth have been filled with hay, the pusher frame is moved forwardly and ejects the hay from the said teeth and in order that it may be readily moved forwardly, I have secured to the rear end of the said frame two upwardly extending links 11 which are pivotally secured to the upper ends of the standards 8, as at 12.

A lever 13 is pivotally connected to the frame 1, as at 14, adjacent the operator's seat 7. Connected to this hand lever 13 and extending forwardly therefrom are two diverging rods 15 which are pivotally connected at their forward ends to the rods 11 between the ends thereof. A coil spring 16 is secured to the hand lever 13 above its pivotal point and to a cross rod 17 on the frame 1, the tendency of this spring being to move the hand lever forwardly and consequently the pusher frame 9 forwardly. The tension of this spring is such as to automatically move the said pusher frame forwardly when the teeth of the sweep are loaded with hay and thus effectively eject the hay from the said teeth. When the sweep is operating to gather hay, the pusher frame 9 is in its rearmost position and the controlling hand lever 13 in its rearmost position. In order that this hand lever 13 may be maintained in such position, I have pivotally secured to the cross rod 17, as at 18, an upwardly extending rod 19 having a resilient hook 20 on the upper end thereof and pivotally connected between its ends a rearwardly extending foot lever 21, the said lever being pivotally connected to the hand lever 13, as at 22, and extending rearwardly therefrom, and terminating in a foot piece 23. Formed on the foot lever 21 between its connecting point with the rod 19 and the hand lever 13 is an outwardly projecting pin 20′ which is adapted to be engaged, as will hereinafter appear.

In the drawings Fig. 3 shows the parts in the relative position they will assume when the pusher frame has ejected the hay from the teeth, to cause the pusher frame 9 to move into its initial position ready for another operation, the hand lever 13 is pulled rearwardly about its pivot 14 and through the connection of the rod 19 by the foot lever 21 therewith, the resilient hook 20 on the upper end of the rod 19 is drawn rearwardly so as to engage the projection 20′ on the said foot lever 21. At this time the foot lever 21 and the rod 19 lie in alinement with each other and because of the fact that the hook 20 is engaged with the projection 20' the hand lever 13 and the foot piece 23 are maintained in their rearmost position and consequently the frame 9 in its rearmost position.

When it is desired to push the hay from the teeth of the sweep by pushing the frame 9 forwardly to such a position as shown in Fig. 2, the foot piece 23 is pushed downwardly, which causes the hook 20 to be disengaged from the projection 20' and the rod 19 and the foot lever 21 thrown out of alinement with each other so that they will assume an angle with relation to each other, the vertex of which is the pivotal point between the said rod 20 and the foot lever 21. The coil spring 16 then acts to draw the hand lever 13 forwardly so that the rods 15 are pushed forwardly and through the connecting rod 11 the frame 9 is pushed forwardly and consequently ejects the hay from the teeth of the sweep.

From the foregoing description it may be readily seen that I have provided an attachment for sweeps which may be readily mounted thereon and by means of which the hay which has been previously collected on the teeth of the sweep may be easily and quickly ejected therefrom.

I have so constructed the ejecting means that the action of the same will be entirely automatic. And I have further constructed the device so that when the hay is being collected on the teeth of the sweep the pusher frame will be locked in its inoperative position.

While I have illustrated and described a particular embodiment of my invention, I wish it to be understood that I do not wish to be limited to that particular embodiment for it is obvious that numerous changes may be made within the scope of the invention as defined by the claims.

What is claimed is:—

1. The combination in a hay rake, of a pusher frame mounted above the teeth of the said rake, a hand lever pivotally supported on the frame of the rake, a pair of rods operatively connected to the said pusher frame and to the hand lever, a locking rod pivotally secured to the said frame and having a resilient hook on one end thereof, a foot lever pivotally connected to said locking rod and to said hand lever and terminating in a foot piece, a projection on said foot lever adapted to be engaged by said resilient hook, and a coil spring secured to the said hand lever and to the frame of the rake.

2. In combination, a rake comprising a frame and forwardly extending teeth, wheels secured to said frame and to said teeth for supporting the frame, a pusher frame mounted above the said teeth and having wheels for independently supporting the same, upwardly extending standards secured to the said frame, rods pivotally secured to the upper ends of the standards and to the rear end of the supporting frame, a hand lever pivotally supported at the rear end of the rake frame, rods connecting the said first mentioned rods and said hand lever, a locking rod pivotally connected to said first mentioned frame and having a resilient hook on the end thereof, a foot lever pivotally connected to said locking rod and said hand lever and having a projection thereon, the said resilient hook adapted to engage said projection to maintain the parts in their locked positions, and resilient means for returning the aforementioned parts to their initial position upon the disengagement of the resilient hook from the projection on the foot lever.

In testimony whereof I affix my signature, in the presence of two witnesses.

ALFRED G. ARGO.

Witnesses:
C. O. PULVERT,
S. S. WERTZ.